(12) United States Patent
Wagner

(10) Patent No.: US 6,279,935 B1
(45) Date of Patent: Aug. 28, 2001

(54) COLLAPSIBLE BICYCLE

(75) Inventor: Bernhard Wagner, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/332,944

(22) Filed: Jun. 15, 1999

(30) Foreign Application Priority Data

Jun. 15, 1998 (TW) .............................. 198 26 538

(51) Int. Cl.[7] .............................. B62K 3/00; B62K 15/00
(52) U.S. Cl. .............................................. 280/287
(58) Field of Search .................... 280/287, 278, 280/270, 272

(56) References Cited

U.S. PATENT DOCUMENTS

| | | | | |
|---|---|---|---|---|
| 3,362,725 | * | 1/1968 | Dolphin | 280/277 |
| 3,374,009 | * | 3/1968 | Jeunet | 280/278 |
| 3,675,944 | * | 7/1972 | Kobayashi | 280/278 |
| 3,942,821 | * | 3/1976 | Beck | 280/277 |
| 4,182,522 | * | 1/1980 | Richie | 280/278 |
| 4,268,055 | * | 5/1981 | Bell | 280/278 |
| 4,900,047 | | 2/1990 | Montague et al. | |
| 5,052,606 | * | 10/1991 | Tsai et al. | 280/287 |
| 5,474,318 | * | 12/1995 | Castellano | 280/284 |
| 5,836,602 | * | 11/1998 | Wang | 280/287 |
| 5,997,022 | * | 12/1999 | Matsui | 280/284 |

FOREIGN PATENT DOCUMENTS

| | | |
|---|---|---|
| 37 01 803 | 8/1988 | (DE) . |
| 93 09 353 | 9/1993 | (DE) . |
| 0565760A1 | 10/1993 | (DE) . |
| 4412188A1 | 10/1995 | (DE) . |
| 19636900A1 | 4/1997 | (DE) . |
| 19620457A1 | 11/1997 | (DE) . |
| 19713671A1 | 11/1997 | (DE) . |
| 2 296 224 | 6/1996 | (GB) . |

OTHER PUBLICATIONS

Search Report, German Patent Office, Dec. 30, 1998.

* cited by examiner

*Primary Examiner*—Robert P. Olszewski
*Assistant Examiner*—Andrew J. Fischer
(74) *Attorney, Agent, or Firm*—Crowell & Moring, L.L.P.

(57) ABSTRACT

A bicycle is described which has a frame at least consisting of a forward frame part with a steering device for a front wheel and a rearward frame part with a rear wheel, the connection between the forward and the rearward frame part consisting at least of a turning knuckle which can be swivelled about a transverse axis of the bicycle. The transverse axis is congruent with a bottom bracket bearing axis. The steering device consists at least of a fork carrying the front wheel and consisting of two fork tubes and a fork bridge, of a handle bar and of a steering tube connecting the handle bar and the fork bridge. The fork bridge is designed such that an offset between the longitudinal axes of the fork tubes and the longitudinal axis of the steering tube exists in the longitudinal direction of the bicycle in a position of the steering device for straight-ahead riding. This has the effect that, at an angle of lock of the steering device of ninety degrees, a distance exists between the fork tubes and a bicycle center plane which permits the swivelling-along of the rear wheel during the swivelling of the rearward frame part about the transverse axis, without any contact with the fork tubes.

9 Claims, 6 Drawing Sheets

COLLAPSIBLE BICYCLE

BACKGROUND AND SUMMARY OF THE INVENTION

This application claims the priority of German application 198 26 538.7, filed in Germany on Jun. 15, 1998, the disclosure(s) of which is (are) expressly incorporated by reference herein.

The invention relates to a collapsible bicycle. Preferred embodiments of the invention relate to collapsible bicycles of the type comprising a forward frame part with a steering device for a front wheel and a rearward frame part with a rear wheel, and a connection between the forward and the rearward frame part including a turning knuckle swivellable about a transverse axis of the bicycle, wherein the steering device includes a fork which carries the front wheel, two fork tubes and one fork bridge, a handle bar and a steering tube connecting the handle bar and the fork bridge.

German Patent Document DE 37 01 803 A1 describes such a bicycle, in the case of which the frame includes a forward frame part with a steering device for a front wheel and of a rearward frame part with a rear wheel, a connection between the forward and the rearward frame part being formed at least by a turning knuckle which can be swivelled about a transverse axis of the bicycle. The transverse axis is congruent with the bottom bracket bearing. The steering device includes a fork which carries the front wheel and includes two forked tubes and a fork bridge, a handle bar and a handle bar tube connecting the handle bar and the fork.

For collapsing the bicycle, the front wheel as well as the rear wheel are removed. It will then be possible to swivel the rearward frame part with the swing arm rear suspension about the axis of rotation, which coincides with the bottom bracket bearing, toward the front. In addition, for reducing the packing dimension, the handle bar can also be rotated by 90°, the front wheel fork maintaining its position. For this purpose, the rigid connection of the handle bar and the front wheel handle must be released which has the effect that, when the bicycle is built together, the front wheel and the handle bar must in each case be adjusted to one another. In addition, the expenditures for collapsing the bicycle become very large because both wheels must be removed, which again has a negative effect on the packing dimension of the collapsed bicycle.

It is an object of the invention to design a collapsible bicycle such that, during the collapsing and in the collapsed condition of the bicycle, the rear wheel can remain mounted in the rear wheel fork, that a packing dimension is achieved which is as small as possible, and that expenditures of labor occur which are as low as possible when, from the collapsed bicycle, a bicycle is to be produced which can be ridden.

According to the invention, this object is achieved by providing a bicycle of the above-mentioned type, wherein the steering device and connection are configured such that, at an angle of lock of the steering device of approximately ninety degrees, a distance exists between the fork tubes and a bicycle center plane which permits the swivelling-along of the rear wheel during the swivelling of the rearward frame part about the transverse axis, without any contact with the fork tubes.

According to the invention, the bicycle is designed such that, in the case of an angle of lock of the steering device of ninety degrees, a distance exists between the fork tubes and a bicycle center plane which permits the swivelling-along of the rear wheel during the swivelling of the rearward frame part about the transverse axis, without any contact with the fork tubes.

Thus, during the swivelling of the rearward frame part, the rear wheel can advantageously remain mounted in the rear wheel fork. In this case, when the bicycle is collapsed, the rearward frame part is swivelled about the transverse axis of the bottom bracket bearing until it comes to rest, for example, on a lower frame tube of the bicycle frame. For this purpose, it is necessary according to certain preferred embodiments that the steering device is steered with an angle of steering lock of approximately 90°. This advantageously reduces the packing dimension because the handle bar extends in the longitudinal direction of the bicycle and thus a very small packing dimension occurs in the transverse direction of the bicycle.

In a preferred embodiment of the invention, the distance between the fork tubes and the bicycle center plane in the case of an angle of lock of the steering device by 90° is achieved by the design of the fork bridge. This fork bridge forms a connection between the fork tubes and the steering tube with an offset between their longitudinal axes. In a position of the steering device for straight-ahead riding, this offset is preferably directed in the longitudinal direction of the bicycle. As a result, the distance which is required for the swivelling-in of the rear wheel to its contact on the lower frame tube advantageously occurs automatically during the steering of the steering device at an angle of lock of 90°.

In another preferred embodiment of the invention, the steering tube and/or the fork bridge are supported by a spring device and/or a damper device on the frame. As a result, a resilient front wheel suspension for a collapsible bicycle is advantageously achieved which has a very stable construction if the frame and the steering device are connected with one another by a longitudinal control arm.

Other objects, advantages and novel features of the present invention will become apparent from the following detailed description of the invention when considered in conjunction with the accompanying drawings.

DETAILED DESCRIPTION OF THE DRAWINGS

Figure 1:
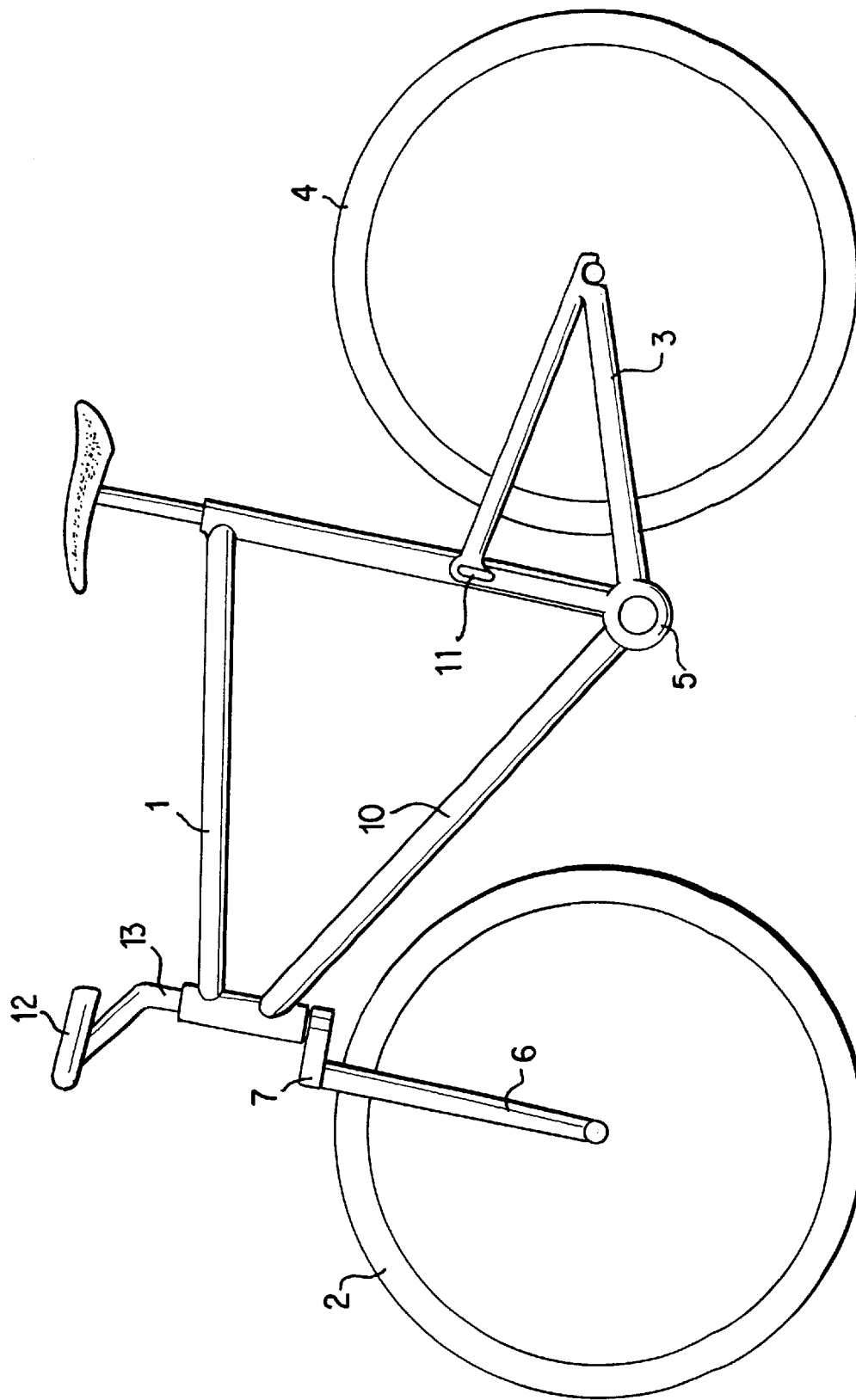
FIG. 1 is a view of a bicycle corresponding to the invention shown without a pedaling and force transmitting device and in the built condition ready to be ridden.

According to FIG. 1, a bicycle collapsed in a small storage space essentially consists of a forward frame part 1 with a steering device for a front wheel 2 and of a rearward frame part 3 with a rear wheel 4. By way of a turning knuckle 5, the forward frame part 1 is connected with the rearward frame part 3 so that both frame parts 1, 3 can be swivelled about the axis of the turning knuckle 5 with respect to one another, said axis being a transverse axis of the bicycle, congruent to a bottom bracket bearing axis for a drive sprocket bearing support.

Figure 3:
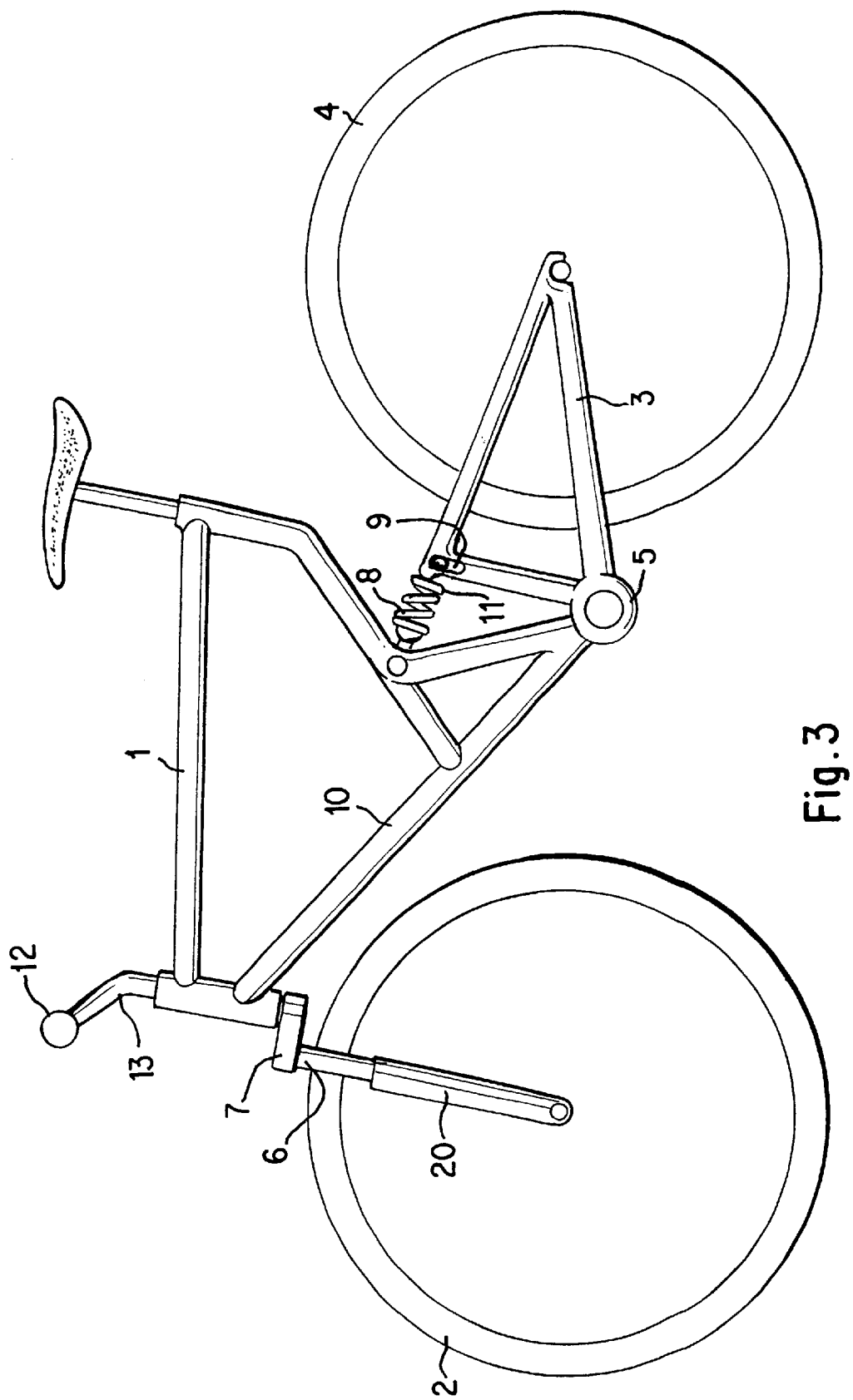
FIGS. 3 and 4 are representations of another embodiment of a bicycle corresponding to FIG. 1 and FIG. 2, with the rear wheel suspension and the front wheel suspension connected by a supporting device having a spring or damping element.
Figure 4:
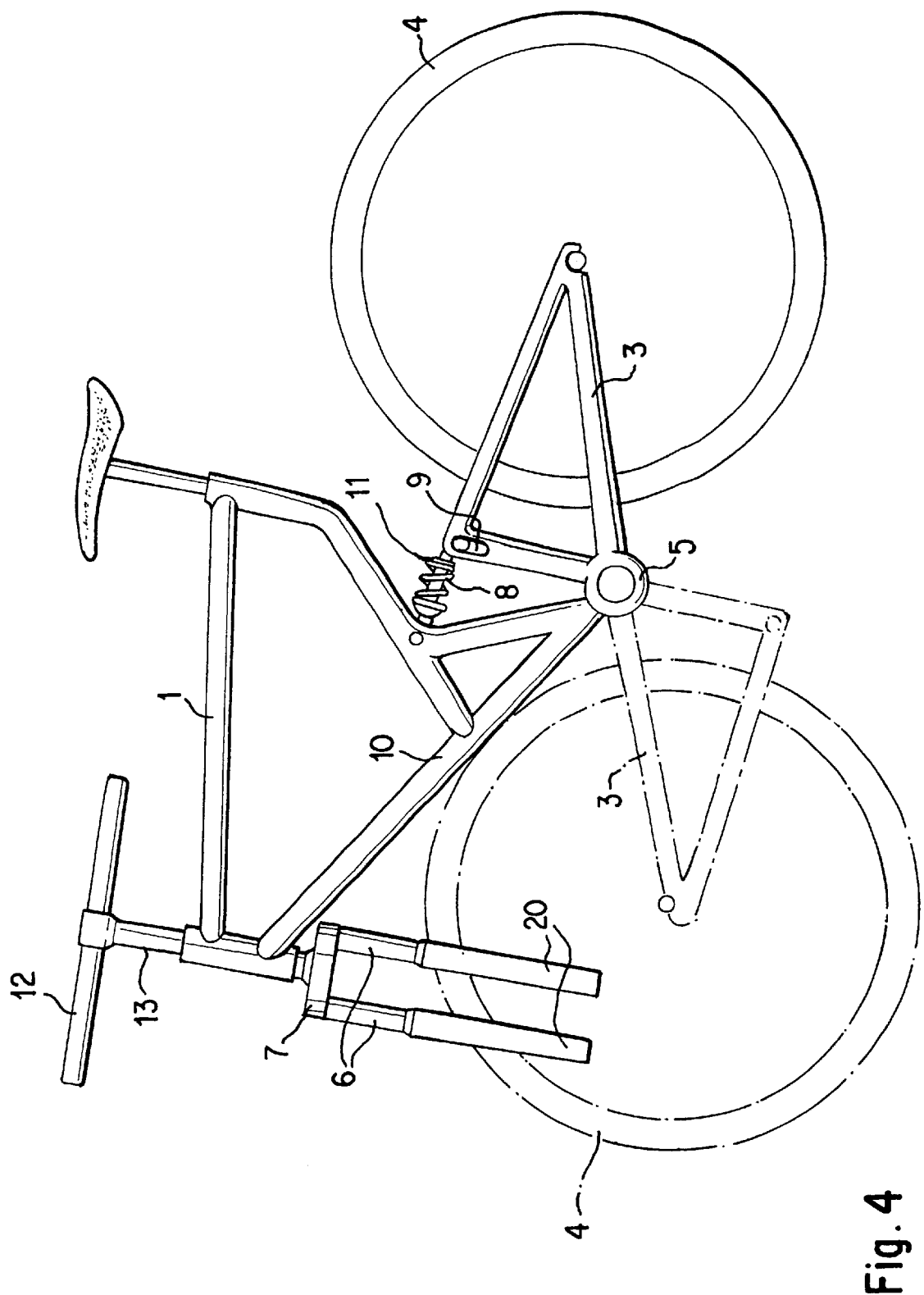

In the riding operation, the collapsing of the two frame parts 1, 3 is prevented in that these are connected with one another by a supporting device 11. This supporting device 11 may be a spring element and/or a damper element 8 which supports the two frame parts 1, 3 with respect to one another (FIG. 3 and FIG. 4).

Figure 1A:
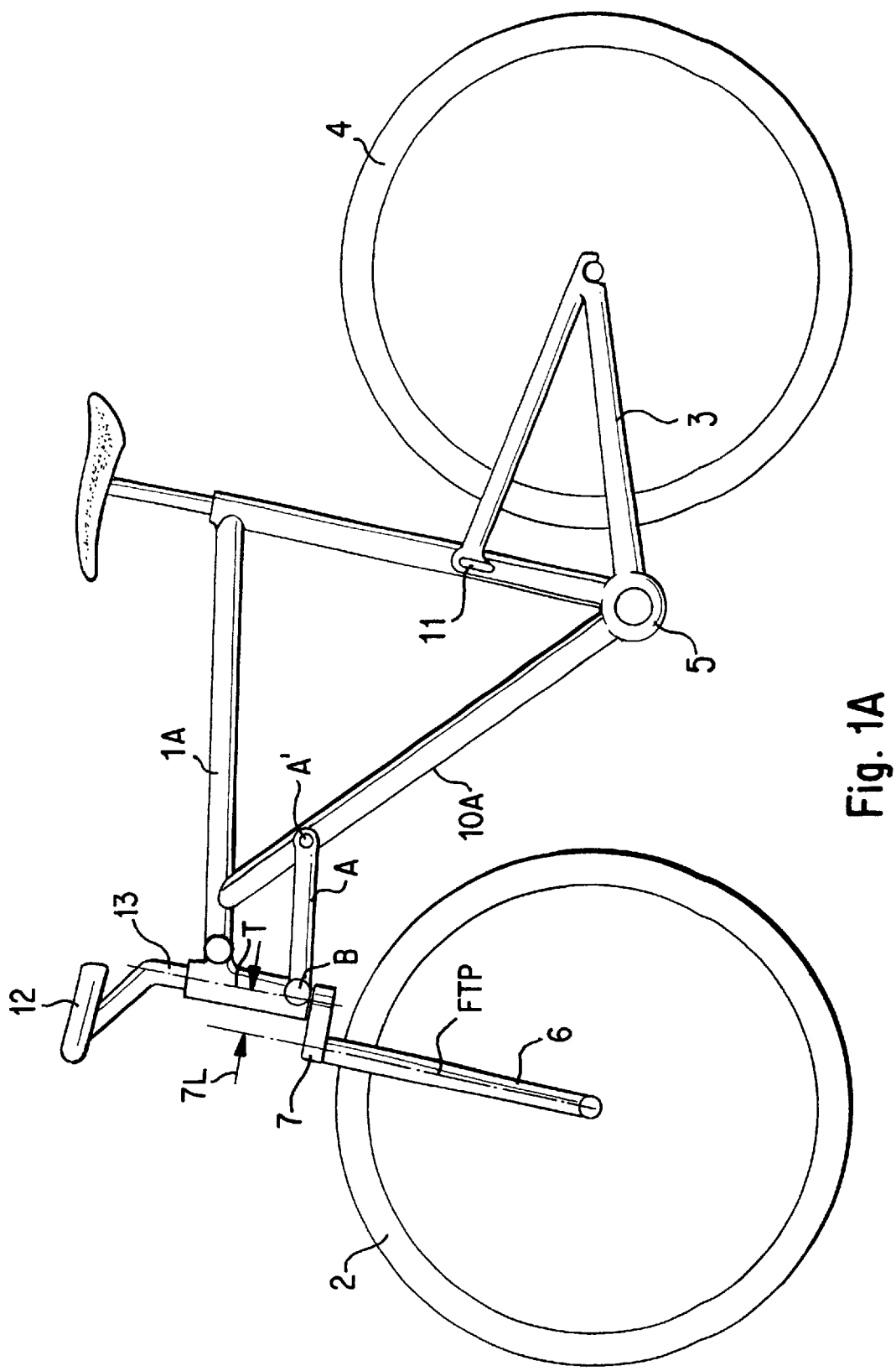
FIG. 1A is a view of a bicycle corresponding to another embodiment of the invention, also shown without a pedaling and force transmitting device and in the built condition ready to be ridden.

Likewise, a suspension of the front wheel 2 can be constructed to be resilient and/or damping, for example, in that the front wheel 2 is accommodated in a fork which carries it and is formed of two fork tubes 6 and a fork bridge 7 which is connected with the forward frame part 1 by a longitudinal control arm as shown in FIG. 1A. In FIG. 1A, the same reference characters are used for similar elements as in the FIG. 1 illustration, with the corresponding description applying to both of the FIG. 1 and 1A embodiments. In the case of this front wheel suspension, which is known per se, the longitudinal control arm A is swivellably about another transverse axis A' of the bicycle mounted on the forward frame part 1A and is supported on the forward frame part 1A by another spring element and/or damper element. It is connected with the fork bridge 7 by way of a ball joint B.

Figure 2:
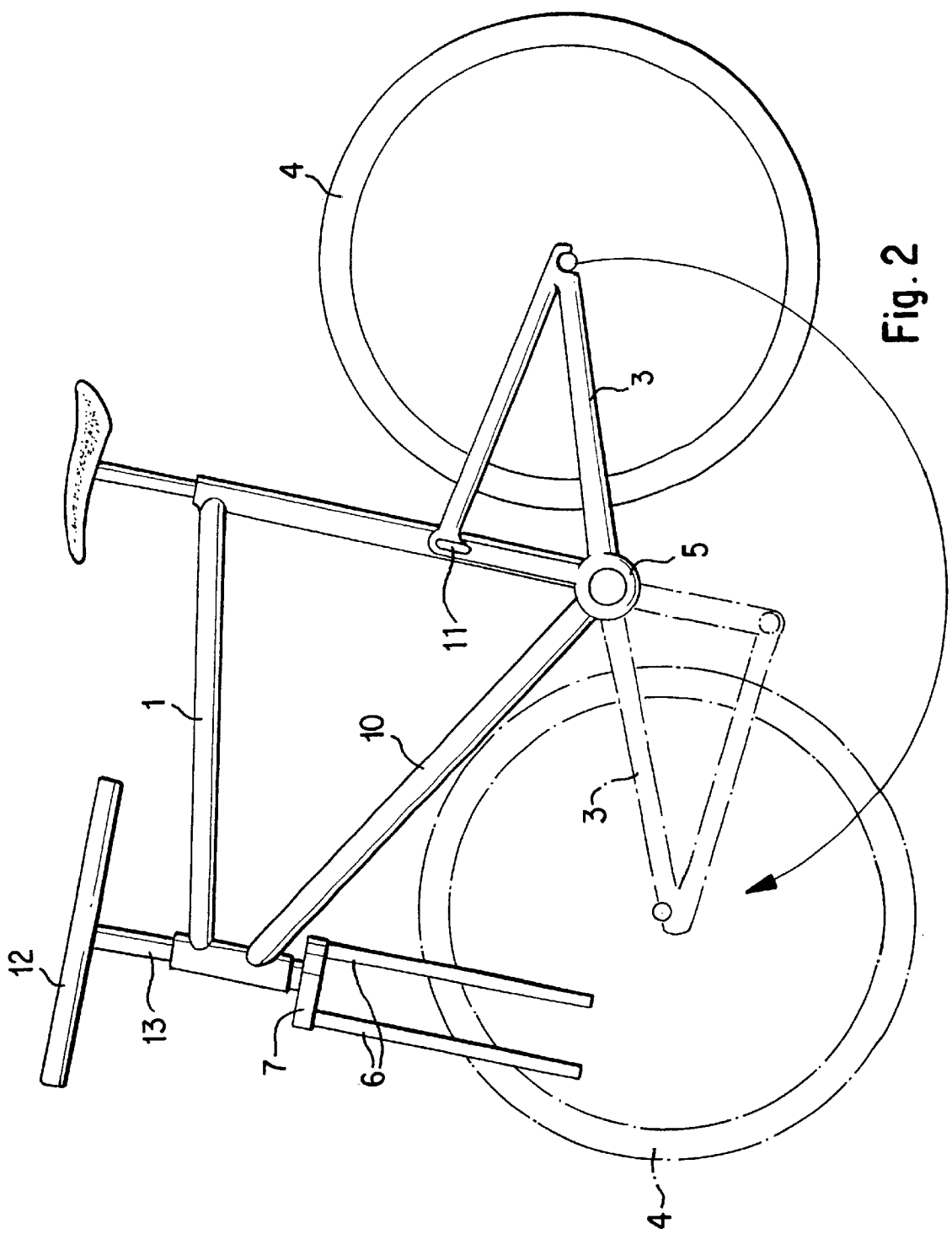
FIG. 2 is a view of the bicycle of FIG. 1 in the built-up condition without the front wheel and - shown by a broken line—in the collapsed condition, with a swivelled-in rearward frame part with the rear wheel.

However, in the construction of the embodiments corresponding to FIGS. 1 and 2, the steering device is not resiliently connected with the frame. Thus, in the embodiment corresponding to FIGS. 1 and 2, no spring element and/or damper element is used in the suspension of the front wheel 2. However, in the second case of FIGS. 3 and 4, the fork tubes 6 are constructed as telescopic spring struts 20 for the suspension and damping of the front wheel 2, For a collapsibility of the bicycle in a storage space which is as small as possible, the spring element and/or damper element 8 is connected on its one end by means of an outlined quick-action fastener 9 with the rearward frame part 3. If the quick-action fastener 9 is released manually, it is possible to swivel the two frame parts 1, 3 about the turning knuckle 5 without any path limitation with respect to one another, until the rear wheel 4 strikes against the front wheel 2. If, as in FIG. 2 or FIG. 4, the front wheel 2 is removed and the steering device is steered from a position in straight-ahead riding direction (FIG. 1 and FIG. 3) by 90° (FIG. 2 and FIG. 4), it is possible to swivel the rear wheel 4 with the rearward frame part 3 even farther until the rear wheel 4 comes to rest against a lower frame tube 10. The rear wheel 4 can be swivelled so far about the turning knuckle 5 because the fork tubes 6 are offset with respect to the steering tube 13. This offset between the longitudinal axes of the fork tubes 6 and the longitudinal axis of the steering tube 13 is formed by the fork bridge 7 and has the effect that, when a handle bar 12 and thus the steering device is steered by an angle of lock of 90°, a distance exists between the fork tubes 6 and a bicycle center plane (which in this case corresponds to the plane of the drawing) which permits the rear wheel 4 to swivel along during the swivelling of the rearward frame part 3, without any contact with the fork tubes 6. This offset is formed by the length "7L" of the fork bridge 7 between the steering handle turning axis T and the fork tube plane FTP which contains the fork tube axes when the bicycle is in a straight ahead driving position as shown in FIG. and 3.

Figure 5:
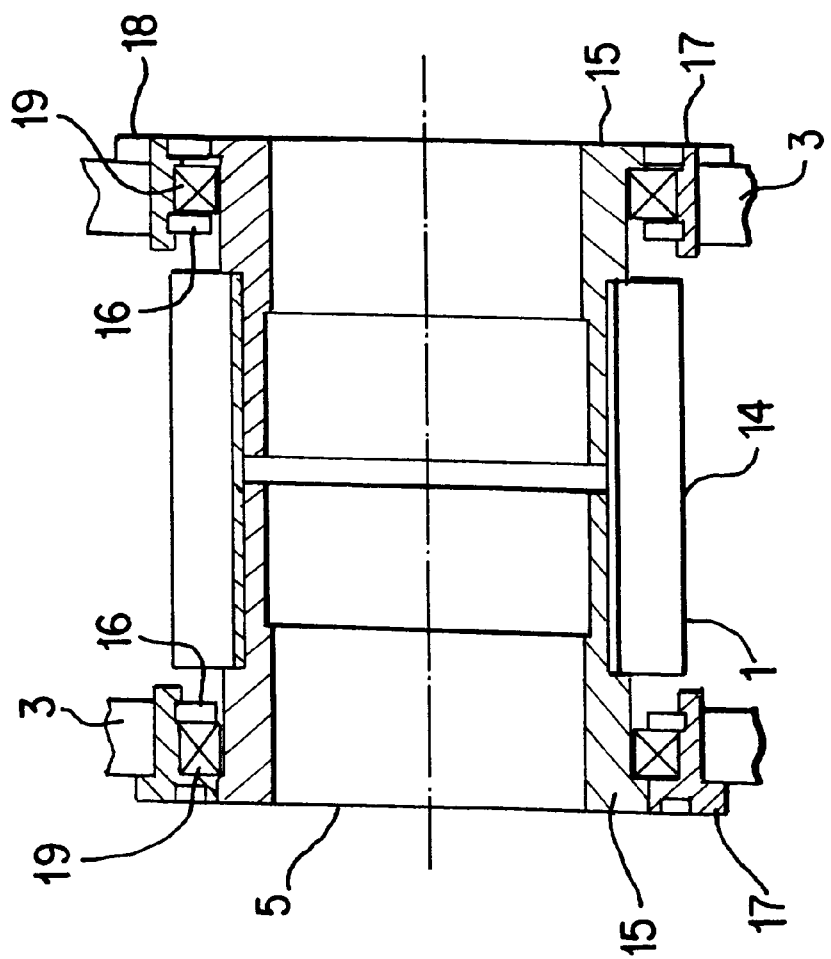
FIG. 5 is a view of the bottom bracket bearing with the turning knuckle for the connection of the forward frame part with the rearward frame part of the embodiments of FIGS. 1–4.

FIG. 5 shows the bottom bracket bearing housing with the turning knuckle 5 for connecting the forward frame part 1 with the rearward frame part 3. For forming the turning knuckle 5, the forward frame part 1 is constructed as a sleeve 14 into which one bottom bracket bearing sleeve 15 respectively is screwed on both sides for receiving a bottom bracket bearing which is not shown. Fixed by way of one Seeger circlip ring 16 and one bearing cap 17 respectively, one bearing 19 respectively is disposed on the outer circumference of each bottom bracket bearing sleeve 15, for the rotatable bearing of the rearward frame part 3 on the respective bottom bracket bearing sleeve 15. For this purpose, the rearward frame part 3 reaches by means of one eye respectively constructed on it around the respective bearing cap 17 on its outer circumference and is fixed there by means of a groove nut 18.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Bicycle comprising:
   a frame having a forward frame part with a steering device for a front wheel and a rearward frame part with a rear wheel, and
   a connection between the forward and the rearward frame part including a turning knuckle swivellable about a transverse axis of the bicycle,
   wherein the frame and the steering device are connected with one another by a longitudinal control arm,
   wherein the steering device includes a fork having a fork bridge and two fork tubes which carries the front wheel between the fork tubes, a handle bar and a steering tube connecting the handle bar and the fork at a bottom end of the steering stube with formation of an L-shaped offset of the fork tube with respect to the steering tube, and
   wherein the steering device and connection are configured such that, at an angle of lock of the steering device of approximately ninety degrees, a distance exists between the fork tubes and a bicycle center plane which permits the swivelling-along of the rear wheel during the swivelling of the rearward frame part about the transverse axis to a collapsed stowage position laterally adjacent the fork tubes, without any contact with the fork tubes.

2. Bicycle according to claim 1, wherein in a position of the steering device for straight-ahead riding, an offset in the longitudinal direction of the bicycle exists between the longitudinal axes of the fork tubes and the longitudinal axis of the steering tube.

3. Bicycle according to claim 1, wherein one of the steering tube and fork bridge is supported on the fork by means of one of a spring device and a damper device.

4. Bicycle according to claim 2, wherein one of the steering tube and fork bridge is supported on the fork by means of one of a spring device and a damper device.

5. Bicycle according to claim 1, wherein the transverse axis of the turning knuckle is congruent with a bottom bracket bearing axis.

6. A collapsible bicycle assembly comprising:
   a forward frame part,
   a rearward frame part operable to support a rear bicycle wheel,
   a pivotal connection with a transverse pivot axis between the rearward frame part and the forward frame part, a steering tube rotatably supported at the forward frame part, a longitudinal control arm connecting the steering tube and forward frame part, a handle bar fixed to the steering tube, a pair of fork legs operable to rotatably support a bicycle front wheel, and a fork bridge connecting a lower section of the steering tube to the fork legs with the fork legs offset longitudinally a predetermined distance from the steering tube with formation of an L-shaped offset of the fork tube with respect to the steering tube so that, at a predetermined turning position of the handle bar and steering tube, the fork legs are moved laterally of the forward frame part to accommodate collapsing movement of the bicycle rearward frame part to a collapsed stowage position laterally adjacent the fork legs.

7. A collapsible bicycle assembly according to claim 6, wherein said pivotal connection has a pivot axis extending parallel to and spaced from a rotational axis of the rear wheel when in use with said rear wheel supported in said rearward frame part.

8. A collapsible bicycle assembly comprising;

a forward frame part, a steering tube rotatably supported at the forward frame part, a handle bar fixed to the steering tube, a pair of fork legs operable to rotatably support a bicycle front wheel, a fork bridge connecting the steering tube to the fork legs with the fork legs offset longitudinally a predetermined distance from the steering tube so that, at a predetermined turning position of the handle bar and steering tube, the fork legs are moved laterally of the forward frame part to accommodate collapsing movement of a bicycle rearward frame part to a collapsed stowage position, a rearward frame part operable to support a rear bicycle wheel, and a pivotal connection between the rearward frame part to the forward frame part, said pivotal connection having a pivot axis extending parallel to and spaced from a rotational axis of the rear wheel when in use with said rear wheel supported in said rearward frame part, wherein said predetermined distance facilitates movement of said fork legs sufficiently laterally of said forward frame part so that said rearward part can be moved to a position where said rear wheel abuts with and is aligned with said forward frame part when said rearward frame part is moved to a collapsed stowage position, and wherein the frame and the steering device are connected with one another by a longitudinal control arm.

9. A collapsible bicycle assembly comprising;

a forward frame part, a steering tube rotatably supported at the forward frame part, a handle bar fixed to the steering tube, a pair of fork legs operable to rotatably support a bicycle front wheel, a fork bridge connecting the steering tube to the fork legs with the fork legs offset longitudinally a predetermined distance from the steering tube so that, at a predetermined turning position of the handle bar and steering tube, the fork legs are moved laterally of the forward frame part to accommodate collapsing movement of a bicycle rearward frame part to a collapsed stowage position, a rearward frame part operable to support a rear bicycle wheel, and a connection between the rearward frame part to the forward frame part operable to permit movement of the rearward frame part to a collapsed stowage position about a transverse axis, wherein said predetermined distance facilitates movement of said fork legs sufficiently laterally of said forward frame part so that said rearward part is moved to a position where said rear wheel abuts with and is aligned with said forward frame part when said rearward frame part is moved to the collapsed stowage position, and wherein the frame and the steering device are connected with one another by a longitudinal control arm.

\* \* \* \* \*